(12) United States Patent
Kotula

(10) Patent No.: US 10,360,773 B2
(45) Date of Patent: *Jul. 23, 2019

(54) CONTINUOUS PRODUCTION LINE REJECT SYSTEM AND METHOD

(71) Applicant: Sensors Incorporated, Delano, MN (US)

(72) Inventor: David J. Kotula, Maple Plain, MN (US)

(73) Assignee: Sensors Incorporated, Delano, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/991,390

(22) Filed: May 29, 2018

(65) Prior Publication Data

US 2019/0066455 A1 Feb. 28, 2019

Related U.S. Application Data

(63) Continuation of application No. 14/827,128, filed on Aug. 14, 2015, now Pat. No. 10,008,078, which is a
(Continued)

(51) Int. Cl.
*G08B 3/10* (2006.01)
*G06Q 10/08* (2012.01)
*G05B 19/418* (2006.01)

(52) U.S. Cl.
CPC ......... *G08B 3/10* (2013.01); *G05B 19/41815* (2013.01); *G06Q 10/08* (2013.01);
(Continued)

(58) Field of Classification Search
CPC .... G05B 19/41815; G05B 2219/39102; G06Q 10/08; G08B 3/10; Y02P 90/08; Y02P 90/14
See application file for complete search history.

(56) References Cited

U.S. PATENT DOCUMENTS 3,529,169 A * 9/1970 Heaney ................... B07C 5/126
250/223 B
3,650,400 A 3/1972 Warren et al.
(Continued)

OTHER PUBLICATIONS

Non-Final Office Action issued in U.S. Appl. No. 14/827,128 dated Jul. 12, 2017.
(Continued)

*Primary Examiner* — Sisay Yacob
(74) *Attorney, Agent, or Firm* — Gardella Grace P.A.

(57) ABSTRACT

A system, including: a sensor that monitors containers as the containers move along a production line; a rejection device; a controller communicatively connected to the sensor and the rejection device, wherein the controller is programmed to determine whether a container is associated with a match condition in response to a signal received from the sensor, the match condition reflecting that the container is associated with predetermined properties or characteristics, in response to a match condition, determine a pass result, and otherwise determine a fail result, determine a velocity of the production line, dynamically determine a correction amount for a reject position, track a position of the container on the production line, and in response to the fail result, outputs a signal to actuate the rejection device that removes the container from the production line based on the velocity of the production line, the dynamically determined correction amount, and the position of the container on the production line.

20 Claims, 6 Drawing Sheets

Related U.S. Application Data continuation of application No. 13/751,842, filed on Jan. 28, 2013, now Pat. No. 9,147,326, which is a continuation-in-part of application No. 13/295,945, filed on Nov. 14, 2011, now Pat. No. 8,368,550, which is a continuation of application No. 12/328,549, filed on Dec. 4, 2008, now Pat. No. 8,077,051, which is a continuation-in-part of application No. 12/207,856, filed on Sep. 10, 2008, now Pat. No. 7,983,779.

(60) Provisional application No. 61/022,132, filed on Jan. 18, 2008.

(52) U.S. Cl.
CPC ..... *G05B 2219/39102* (2013.01); *Y02P 90/08* (2015.11); *Y02P 90/14* (2015.11)

(56) References Cited

U.S. PATENT DOCUMENTS

| | | | |
|---|---|---|---|
| 3,857,648 A | 12/1974 | Eggert | |
| 3,955,179 A * | 5/1976 | Planke | B07C 5/126 |
| | | | 382/142 |
| 4,166,949 A | 9/1979 | Pold et al. | |
| 4,259,571 A | 3/1981 | Dubberly | |
| 4,386,708 A | 6/1983 | Sieverin | |
| 4,476,981 A | 10/1984 | Yoshida | |
| 4,604,704 A * | 8/1986 | Eaves | G06Q 10/08 |
| | | | 198/460.1 |
| 4,912,337 A | 3/1990 | Wilwerding | |
| 4,959,538 A | 9/1990 | Swart | |
| 5,141,111 A | 8/1992 | Licht | |
| 5,755,335 A | 5/1998 | Michelotti et al. | |
| 5,841,661 A | 11/1998 | Buchanan et al. | |
| 6,237,418 B1 | 5/2001 | Coughlin et al. | |
| 6,370,447 B1 * | 4/2002 | Miyazaki | B65G 43/10 |
| | | | 198/349.8 |
| 6,522,943 B2 | 2/2003 | Dierauer | |
| 7,497,316 B2 | 3/2009 | Hysell et al. | |
| 8,047,359 B2 | 11/2011 | Fellows et al. | |
| 2003/0023882 A1 | 1/2003 | Udom | |
| 2003/0176942 A1 * | 9/2003 | Sleep | B65B 5/103 |
| | | | 700/213 |
| 2012/0267534 A1 | 10/2012 | Ijuin et al. | |

OTHER PUBLICATIONS

Notice of Allowance issued in U.S. Appl. No. 14/827,128 dated Mar. 29, 2018.
Non-Final Office Action issued in U.S. Appl. No. 13/751,842 dated Jan. 21, 2015.
Notice of Allowance issued in U.S. Appl. No. 13/751,842 dated May 21, 2015.
First Action Interview Pilot Program Pre-Interview Communication issued in U.S. Appl. No. 13/295,945 dated Jun. 11, 2012.
Notice of Allowance issued in U.S. Appl. No. 13/295,945 dated Oct. 2, 2012.
Non-Final Office Action issued in U.S. Appl. No. 12/328,549 dated Nov. 24, 2010.
Notice of Allowance issued in U.S. Appl. No. 12/328,549 dated Nov. 15, 2011.
Non-Final Office Action issued in U.S. Appl. No. 12/207,856 dated Sep. 24, 2010.
Notice of Allowance issued in U.S. Appl. No. 12/207,856 dated Apr. 11, 2011.

* cited by examiner

CONTINUOUS PRODUCTION LINE REJECT SYSTEM AND METHOD

CROSS REFERENCE TO RELATED APPLICATIONS

The present application is a continuation of application Ser. No. 14/827,128, filed Aug. 14, 2015, which is a continuation of application Ser. No. 13/751,842, filed Jan. 28, 2013 (now U.S. Pat. No. 9,147,326, issued Sep. 29, 2015), which is a continuation-in-part of application Ser. No. 13/295,945, filed Nov. 14, 2011 (now U.S. Pat. No. 8,368,550, issued Feb. 5, 2013), which is a continuation of application Ser. No. 12/328,549, filed on Dec. 4, 2008 (now U.S. Pat. No. 8,077,051, issued Dec. 13, 2011), which is a continuation-in-part of U.S. patent application Ser. No. 12/207,856, filed on Sep. 10, 2008 (now U.S. Pat. No. 7,983,779, issued Jul. 19, 2011), which claims the benefit of U.S. Provisional Application Ser. No. 61/022,132, filed on Jan. 18, 2008. All above identified applications are hereby incorporated by reference in their entireties.

BACKGROUND

Food processed in a manufacturing facility is highly controlled to ensure safe conditions for consumers. The dangers in manufactured food includes equipment falling into the food, bacterial or fungal contamination, and allergen contamination. The number of individuals particularly children with food allergies has increased dramatically in the last twenty years. Dairy and wheat are potentially deadly allergens common in processed foods. Even trace amounts of an allergen can cause health issues.

To combat this problem, manufacturers process non-allergen versions of their products. Separate manufacturing lines are often constructed to avoid any trace contamination. In the event of cross-contamination, however, hours or days of production may need to be recalled to prevent distribution of tainted food products.

SUMMARY

A system, including: a sensor that monitors containers as the containers move along a production line; a rejection device; a controller communicatively connected to the sensor and the rejection device, wherein the controller is programmed to determine whether a container is associated with a match condition in response to a signal received from the sensor, the match condition reflecting that the container is associated with predetermined properties or characteristics, in response to a match condition, determine a pass result, and otherwise determine a fail result, determine a velocity of the production line, dynamically determine a correction amount for a reject position, track a position of the container on the production line, and in response to the fail result, outputs a signal to actuate the rejection device that removes the container from the production line based on the velocity of the production line, the dynamically determined correction amount, and the position of the container on the production line.

DETAILED DESCRIPTION OF ILLUSTRATIVE IMPLEMENTATIONS

Figure 1:
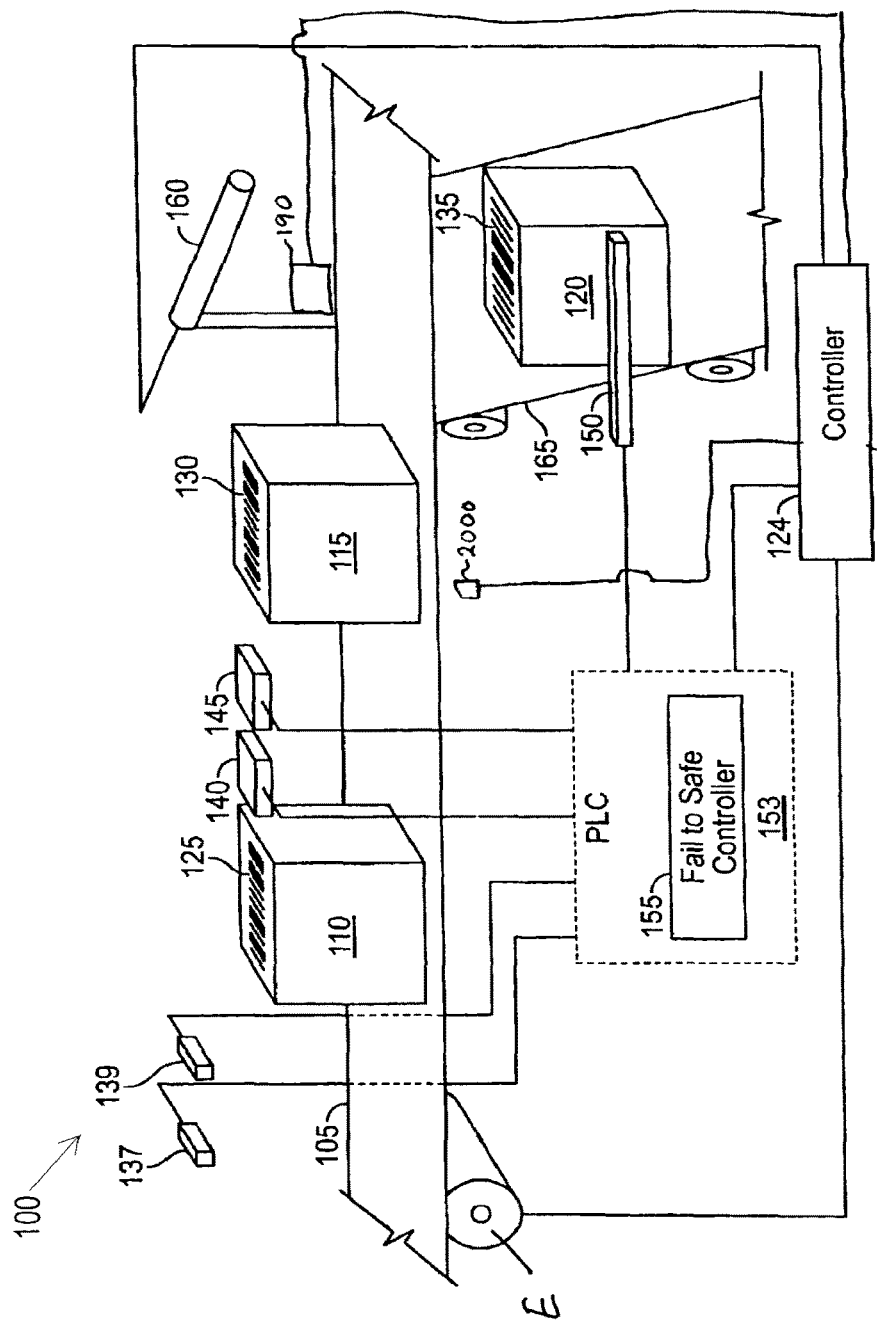
FIG. 1 shows an exemplary manufacturing system that includes a fail-to-safe system.

Food producers can reduce the risk of food allergies for consumers by implementing a product handing fail-to-safe system, such as an example fail-to-safe system 100 illustrated in FIG. 1. In general, fail-to-safe systems are systems that fail in a way such that no harm, or a minimum of harm, is caused to people or equipment.

In some embodiments, fail-to-safe systems may be configured using combinations of redundant inputs, outputs, feedback circuits, or combinations of these or other circuits. For example, a fail-to-safe system may be configured by using multiple parallel outputs to activate a circuit. A primary output may have one or more secondary outputs that achieve the same task as the primary output. If the primary output were to fail, the secondary output may still be able to activate the circuit. In another example, feedback circuits may be used to monitor an output. If the output fails, or the circuit fails to activate, the feedback circuit may be monitored to detect the failure and raise an alarm and/or initiate a shutdown.

In some embodiments, voting logic may be used to create a fail-to-safe system where redundant systems perform the same computation or measurement to determine a safe result. For example, two barcode scanners may be used to scan a single barcode. If the two scanners do not return a substantially identical result, the barcode may be rejected since there may be no way to determine which barcode scanner may have read code correctly. In another example, three or more barcode scanners may be used to scan a single barcode. If a majority of the barcode scanners return a substantially identical result, the barcode may be accepted.

One implementation of a barcode scanner can include a barcode scanner as described in the figures and description of U.S. patent application Ser. No. 10/283,781, filed on Oct. 30, 2002 by Long Xiang Bian et al. and entitled "Barcode Detection System," such figures and description being incorporated herein by reference.

In the example of the fail-to-safe system 100, a fail-to-safe configuration of equipment can reduce the risk of food allergens by implementing a redundant and fail-to-safe system to prevent allergenic food products from being intermixed with non-allergenic food products. The fail-to-safe system 100 can include a conveyor 105. The conveyor is controlled by a controller 124. The controller 124 may include PLC (programmable logic controller). A suitable PLC is, for example, the Allen Bradley PLC 1400. The conveyor 105 moves a number of items, such as an item 110, an item 115, and an item 120. In some embodiments, the items 110-120 may be food products, ingredients, chemical substances, or other items that may be defined as allergenic or non-allergenic. In some embodiments, the items 110-120 may be filled or empty packaging materials, boxes, cartons, tubes, cans, cylinders, or other items that can be used to contain items that may be defined as allergenic or non-allergenic.

The actual speed of conveyor 105 is unknown to controller 124 because the conveyor speed is set by another controller (upstream or downstream of controller 124) not shown in the figures. The controller 124 monitors pulses output from a position encoder (See E in FIG. 1) mounted to conveyor 105. The encoder E may be an optical disc or magnetic disc that creates a fixed number of pulses per revolution. For example, the encoder E may produce a pulsed output that permits the controller 124 to monitor the position of each product on the conveyor 105 to a resolution of 0.1 inches per pulse (or 10 pulses per inch).

The item 110 includes a code 125, the item 115 includes a code 130, and the item 120 includes a code 135. In some embodiments, the codes 125-135 may be alphanumeric characters, symbols, codes (e.g., bar codes, data matrix codes), colors, radio frequency identification (RFID) tags, magnetic stripes, or a combination of one or more of these and/or other codes that may be used to identify and/or classify an item. For example, the code 125 may be a code that may directly identify an item as being allergenic or non-allergenic. In another example, the code 125 may be a code that identifies the item 110, and the identity of the item 110 may be used to query a list or database of items to determine if the item 110 contains one or more allergens. In still other examples, the items 110-120 may carry multiple codes that identify multiple allergens.

The codes 125-135 are used to classify the items 110-120. In some embodiments, the items may be classified by their contents. For example, the codes 125 and 130 may indicate that the items 110 and 115 are free of wheat products, and the code 135 may indicate that the item 120 contains an allergen such as wheat.

The fail-to-safe system 100 includes a sensor 137, a sensor 139, a sensor 140, a sensor 145, and a sensor 150. In some embodiments, the sensors 137-139 can be configured to transmit a signal when the presence of an item, such as item 110, is detected on the conveyor at a position proximate the sensor 137-139. In some embodiments, the sensors 140-150 may be configured to detect alphanumeric characters, symbols, codes (e.g., bar codes, data matrix codes), colors, radio frequency identification (RFID) tags, magnetic stripes, or other codes that may be used to identify and/or classify an item. The sensors 140-150 are configured to scan the codes 125-135 to determine the classification of the items 110-120. For example, the sensors 140-150 may be configured to determine whether one or more of the items 110-120 are classified as containing an allergen, such as wheat or nuts.

In the illustrated example, the codes 125 and 130 indicate that the items 110 and 115 are free of one or more allergens, whereas the code 135 indicates that the item 120 contains an allergen. As the conveyor 105 moves, the items 110-120 are scanned by sensors 140 and 145.

The fail-to-safe system 100 receives outputs from the sensors 137-150. The sensor system 137-155 can have three or more outputs, providing information to classify an item. For example, one output provides information to the sensor system 137-155 that the item can be classified as a match, a second output can provide information to the sensor system 137-155 that the item is not a match, and a third output can provide information to the sensor system 137-155 that a malfunction has occurred in the sensor system 137-155. In some embodiments, a fourth output can be received to provide information regarding an item's reject status. In some embodiments, two outputs may be required to provide that two different codes on an item are both matches.

Likewise, each of the sensors 140 and 145 can report one of three states to a controller 155. The first state indicates that a sensed code (e.g., the code 125) is a positive read (e.g., matches an expected code). The second state indicates that a sensed code (e.g., the code 135) is a negative read (e.g., does not match an expected code). The third state indicates that no signal has been received (e.g., no read was performed).

The second state that the sensors 140 and 145 may provide can cause the controller 155 respond in one or more ways. In some implementations, the controller 155 may respond by sending a signal to the controller 124 to reject each item that is not positively read. In other implementations, the controller 155 may send a signal to the controller 124 stop the conveyor when one or more of the sensors 140 and 145 reports the second state. In still other implementations, the controller 155 may count the number of negative reads that have been made by the sensors 140 and/or 145. For example, the fail-to-safe system 100 may send a signal to the controller 124 shut down the conveyor 105 after two, three, four, or more consecutive second state signals. In another example, the fail-to-safe system 100 may send a signal to the controller 124 shut down the conveyor 105 if the ratio of negative to positive reads exceeds a threshold, for instance, a shutdown may be performed if three of the last five are negative.

The sensors 140-145 can transmit a signal to a buffer in the controller 155. For example, the buffer can receive an ASCII code to provide positive read information to indicate a match of an expected code. Likewise, the buffer can receive an ASCII code to receive a negative code, such as a code providing that an error has occurred within the sensors 140-145. In such a situation where the buffer is cleared and receives no new data after a set period of time, the controller 155 can determine that no signal has been received. For example, if one of the sensors 140-150 becomes disconnected and does not provide input, the buffer may have a default setting that the controller 155 is programmed to recognize as an error code. Alternatively, each time the buffer is refreshed, a signal can be triggered in the controller 155 that the buffer has refreshed. If the signal is not sent, the controller 155 can determine that a new sensor signal has not been provided. Likewise, a heartbeat signal, or signal to mimic the period of time expected between each container, can be used to determine if the register may be refreshed. In some implementations, the heartbeat signal can be provided to the controller 155. Similarly, an additional, redundant heartbeat signal can be sent to the controller 155. The controller 155 can provide a halt signal to the controller 124 that the system 100 is not operating as configured. The controller 155 can shut down the conveyor 105 or reject all items until the buffer is refreshed.

In some embodiments, the sensor 137 and the sensor 139 can each transmit a signal to the controller 155 that an item has been detected. The controller 155 can then transmit a signal to the sensor 140 to enable it to scan the item. Likewise, the sensor 145 can also be enabled to scan the item receiving a signal from the controller 155. In some embodiments, the controller 155 can send the signal after a period of time, so that the item has time to travel to the sensor 140. Alternatively, the controller 155 can transmit the signal upon receiving the signal from the sensors 137-139 that the item has been detected.

In some embodiments, the controller 155 can send a signal if one sensor sends a signal that an item has been detected. For example, if sensor 137 detects an item, but sensor 139 does not transmit a signal that an item has been detected, the controller 155 can still transmit a signal to sensors 140-145 to scan the item. In some embodiments, the controller 155 can send a signal to the PLC 153 that the sensor 139 may be disabled, broken, or in need of repair.

In some embodiments, the controller 155 may signal an alarm. For example, an alarm may be signaled if one or more of the sensors 140-150 fails, if the conveyor 105 is stopped, if a rejected item is not sensed by the sensor 150, or for other events that may require an operator's attention. In some embodiments, an alarm may be indicated using a visual indicator (e.g., a semaphore, light tree).

The sensors 140 and 145 provide signals to classify the items 110-120. For example, the controller 155 may receive signals that indicate that both of the sensors 140 and 145 have positively read the code 130. The controller 155 responds by permitting the item 115 to continue down the conveyor 105. In examples where the controller 155 does not receive positive identification signals from both of the sensors 140 and 145, the fail-to-safe system 100 fails to safe and sends a signal to the controller 124 to reject an item, such as the item 120. The controller 155 will only allow the items 110-125 to stay on the conveyor 105 if both of the sensors 140 and 145 have positively read the codes. A negative read by either or both of the sensors 140 and 145 will cause the system 100 to fail-to-safe and reject the offending item.

The fail-to-safe system 100 includes a diverter 160 and a reject path 165. In some embodiments, the diverter 160 may be an arm, blade, pusher, stepper motor, servo motor, air cylinder, pneumatic blow-off, or other device that can be activated to divert an item, such as the item 135, off the conveyor 105 and onto the reject path 165. In another example, the controller 155 may receive signals that indicate that both of the sensors 140 and 145 have not positively read the code 135, indicating that the item 120 was not expected on the conveyor 105 and may contain an allergen. The controller 155 responds by sending a signal to the controller 124 to activate the diverter 160 to redirect the item 135 onto the reject path 165.

The controller 155 generates a rejection signal that energizes and opens a normally closed valve by providing a pulse to a solenoid of air cylinder 160. This provides a pulse of air to rapidly extend a piston rod of air cylinder 160 to knock an unacceptable container from the conveyor 105. In some embodiments, before the piston rod reaches full stroke in its path toward an end wall, a retract valve is already beginning to build pressure in the retract side of the air cylinder 160. The retract air pulse reaches maximum pressure when the piston rod has moved to its most extended position and begins to rebound from piston seal shock absorbers of the air cylinder 160. The rebound force plus the retract pressure already building forces the extend side of the air cylinder 160 to exhaust rapidly thus reducing the normal time to retract the piston rod. With this increased stroke speed, air cylinder 160 is capable of rejecting products even when the products are touching or are separated by a few thousandths of an inch.

The sensors 140 and 145 operate as a redundant, fail-to-safe pair. In some implementations, a positive identification of an item (e.g., the item 115) is made when the controller 155 detects that both of the sensors 140 and 145 have indicated that a positive read of the code 130 has been made. In some implementations, a negative identification can be made when the controller 155 receives signals from either or both of the sensors 140 and/or 145 that indicate that the code 130 was not positively read. For example, the code 130 may have been marginally identifiable. The marginal quality of the code 130 may cause sensor 140 to make a positive identification of the item 120 and the sensor 145 to make a negative identification the item 120. The controller 155 detects this discrepancy and responds by rejecting the item 120.

In some implementations, the controller 155 may detect that one or both of the sensors 140 and/or 145 have made no identification at all, and the controller 155 may respond by sending a signal to the controller 124 to stop the conveyor 105. In some implementations, the controller 155 may respond to a failure of one of the sensors 140 or 145 by relying on the one active sensor and setting a service alarm to indicate that the failed sensor is in need of service.

Items, such as the item 135, on the reject path 165 pass by the sensor 150. As the item 135 moves past the sensor 150, the sensor 150 senses the code 135 and provides a detection signal to the controller 155. In some implementations, the controller 155 may use a signal from the sensor 150 to confirm that the item 120 has been removed from the conveyor 105. In some implementations, the controller 155 may detect that the sensor 150 has not detected the item 120 and send a signal to the controller 124 stop the conveyor 105 until line operators can inspect the items 110-120 to ensure that an allergenic item is removed from the conveyor 105.

Although the fail-to-safe system 100 has been described in terms of identifying items 110-120 to detect allergenic products, other implementations may exist. In some implementations, the fail-to-safe system 100 may be used to identify items by make, model, brand, or other criteria that may be used to classify items. For example, a factory may use the conveyor 105 to produce similar products (e.g., frozen pizzas, canned vegetables, sodas) under two or more brand names. The fail-to-safe system 100 may be used to reject incorrectly branded products that have been detected on the conveyor 105.

In some implementations, the fail-to-safe system 100 may be used to identify items by size, quality, quantity, or other criteria that may be used to classify items. For example, the sensors 140 and 145 may be configured to perform and confirm visual inspections of the items 110-120 to perform counts (e.g., the number of pills in a blister pack), optical measurements (e.g., inspecting the prescription of lenses, counting the teeth on gears), or color measurements (e.g., to evaluate the quality of meats, to evaluate the ripeness of vegetables). In some implementations, the sensors 140 and 145 may be configured to perform and confirm other types of inspections. For example, the sensors 140 and 145 may detect metal in food products, the conductivity of an electrical circuit, the fidelity of a speaker, the viscosity of a liquid, or other qualities of the items 110-120 that may be detected with a sensor.

In some embodiments, if the controller 155 fails, the fail-to-safe system 100 can still fail safely. For example, the diverter 160 may be configured so that the item 110 will be allowed to continue along the conveyor 105 only when activated by the controller 124 receiving a signal from the controller 155 to do so. If the controller 155 fails, no signal is sent to activate the diverter 160, and the item 110 will be diverted to the reject path 165.

In some embodiments, the sensor system 137-155 can be bypassed so that if it is malfunctioning, the conveyor 105 can still run. For example, personnel can lock out the sensor system 137-155 and put the sensor system 137-155 into bypass mode so that the fail-to-safe behavior is no longer operational, but the items 110-120 still travel on the conveyor 105.

In some embodiments, the controller 155 may shut down the conveyor 105 using a relay. In some embodiments, the relay may include redundant contacts and/or multiple channels. For example, the relay may include multiple contacts so if one contact fails (e.g., welds, burns), another contact may still be used to stop the conveyor 105. In some embodiments, the relay may be monitored by the controller 155. For example, the controller 155 may send a first signal to activate the relay using a first relay channel, and the controller 155 may verify the activation of the relay by monitoring a second signal that is connected through a second relay channel.

In some embodiments, the configuration of one of the sensors 140-150 can be copied to a replacement sensor. For example, the sensors 140 and 145 may have a common configuration, and if one of the sensors 140 or 145 fails, a technician may be able to copy the common configuration from the remaining operational sensor to the replacement sensor.

In some implementations, a physical key to take the apparatus offline can be used. For example, the physical key can be used to put the system 100 into a bypass mode. In some implementations, the bypass mode can be initiated if the system 100 has a component failure. For example, if the controller 155 or one or more of the sensors 137-150 fails, the sensor system 137-155 can operate in bypass mode. As such, the conveyor 105 can continue to operate while a component undergoes maintenance or repair.

In some embodiments, the system 100 may include a semaphore (e.g., light tree). The semaphore may display various patterns of lights to indicate the state of the sensor system 137-155. For example, the semaphore may show a green light if the sensor system 137-155 is operating normally, or show a yellow light if the sensor 150 is blocked. The semaphore may indicate various alarm states. For example, the semaphore may blink a red light if an allergenic item has not been detected by the sensor 150.

In some embodiments, the sensor system 137-155 may include a semaphore and/or other visual indicators to provide a visual feedback when a line operator is configuring the sensor system 137-155. For example, the line operator may wish to reconfigure the sensors 140-155 to identify a new code. The line operator may turn a selector switch from a "RUN" position to a "TEACH" position, and the controller 155 may cause the semaphore to blink a green light to indicate that the "TEACH" mode is active. The line operator may present the new code to one or more of the sensors 140-150 to teach the new code to the sensors 140-150. The operator may have the option to confirm that the new code has been taught by presenting the new code to the sensors 140-150 a second time, and determine if the new code has been taught by observing the illumination of a green "match" indicator. If the new code was not taught, a red "no match" indicator may illuminate. The operator may turn the selector switch to the "RUN" mode, and the controller may respond by illuminating a steady green light.

In some embodiments, the controller 155 may log items 110-120 according to the time they are scanned. For example, a log can record the time an item is scanned and the state of the item. In some embodiments, the log can be transmitted to a server so that the log can be viewed from various locations. In some embodiments, the log can be viewed through a password-protected website. For example, if several controllers all upload logs to the server, a user can view rejects on multiple lines or analyze various changes in rejects over time.

In some embodiments, the semaphore may indicate the state of the sensor system 137-155 during a configuration process. For example, the semaphore may blink green when the system 100 has been set to a "teach" mode, display a steady red light when placed in a "bypass" mode.

Figure 2:
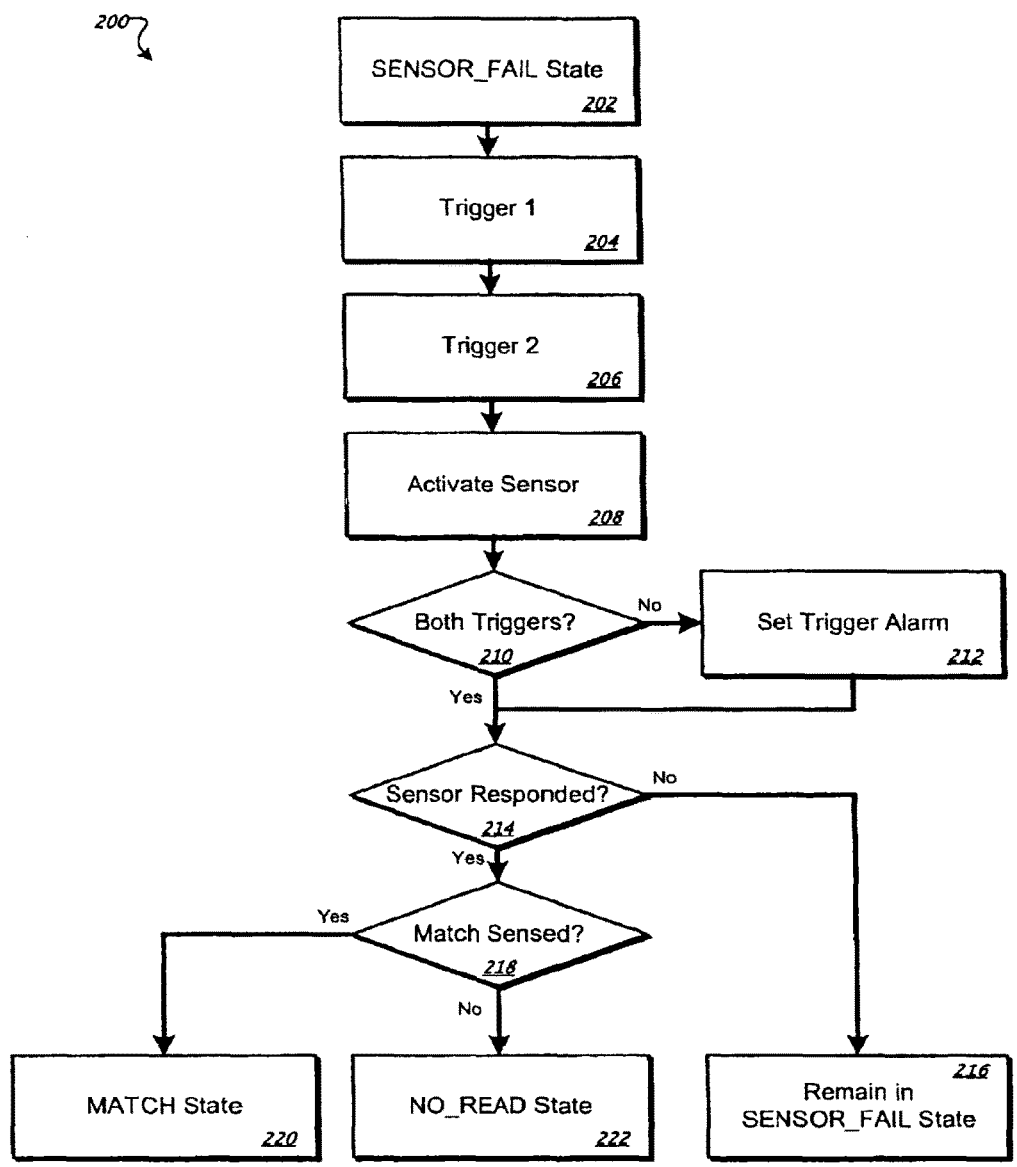
FIG. 2 shows an exemplary three-state sensor process for fail-to-safe code allergen detection.

FIG. 2 shows an example three-state sensor process 200 for fail-to-safe code detection. In general, the process assumes that a SENSOR_FAIL state exists (e.g., one or more sensors have failed) unless a signal from the sensor is detected. A functional sensor may respond with a signal that indicates that a code (e.g., the code 125 of FIG. 1) either matches an expected code, or that the sensor does not read an expected code. A code match will cause a MATCH state to be set, and no code read will cause a NO_READ state to be set. If no MATCH or NO_READ state has been set, then the SENSOR_FAIL state will remain set. This state can occur because of an actual sensor failure, or because the code does not match the expected code.

The process 200 starts when a SENSOR_FAIL is set (202). As an item (e.g., the item 110 of FIG. 1) moves down a conveyor (e.g., the conveyor 105), a first sensor (e.g., the sensor 137 of FIG. 1) is triggered (204), and a second sensor (e.g., the sensor 139 of FIG. 1) is triggered (206). In some embodiments, the first and second sensors 137-139 may be presence detectors. For example, the detectors may be break-beam detectors, photo-eyes, ultrasonic rangefinders, Hall-effect sensors, or other sensors that may be used to detect the presence of an item.

The first and second sensors 137-139 form a redundant pair. When either or both of the sensors 137-139 are triggered (204)-(206), a controller such as the controller 155 of FIG. 1 activates a third sensor (208) to sense a code (e.g., the code 125). In some embodiments, the third sensor may be a sensor that can identify a code(e.g., the sensor 140 of FIG. 1). In some embodiments, the controller 155 may increment a barcode cycle register when a trigger signal is detected.

If one of the first and/or second sensors 137-139 fails to trigger (210), then a trigger alarm is set (212). In some implementations, the trigger alarm may alert line operators that one of the sensors 137-139 may have malfunctioned and needs service. If the third sensor 140 does not respond (214) within a predetermined timeout period, then the SENSOR_FAIL state remains (216). In some embodiments, multiple successive sensor and/or trigger failures may trigger an alarm. For example, if the third sensor 140 to respond (214) for three successive items, an alarm may be set to cause a shutdown of the conveyor. In another example, an alarm may be set if three of the last five items did not cause the sensor 140 to respond (214).

If the third sensor 140 responds (214) within the predetermined timeout period, the response will indicate whether a match for the code has been made. If a match is sensed (218), then a MATCH state is set (220). If no read is sensed, then a NO_READ state is set (222).

In some embodiments, the SENSOR_FAIL, MATCH, and/or NO_READ states may be accompanied by visual indications for a line operator. For example, when a MATCH state is set (220), an output signal may be activated to illuminate a green "match" indicator. When a NO_READ state is set (222), an output signal may be activated to illuminate a red "no read" indicator.

In some embodiments, the process 200 may include a machine cycle counter. The machine cycle counter may be indexed whenever the process is started for an item. If the machine cycle count indexes and no trigger signal is sent to the controller, the SENSOR_FAIL state remains in effect and the item is rejected. In some implementations, rejecting items in response to a sensor failure may cause the process to continue without items on the conveyor 105.

Figure 3A:
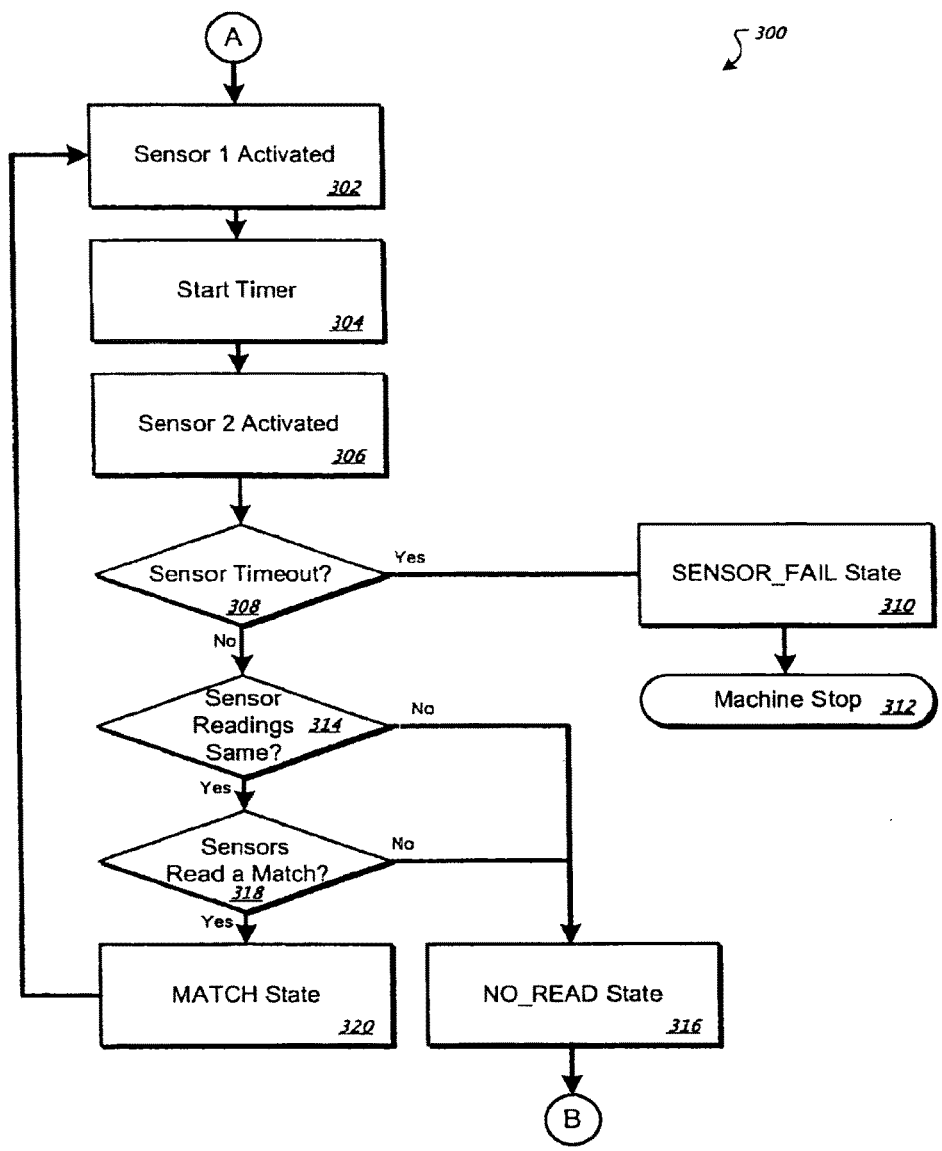
FIGS. 3A and 3B show an exemplary fail-to-safe inspection process.
Figure 3B:
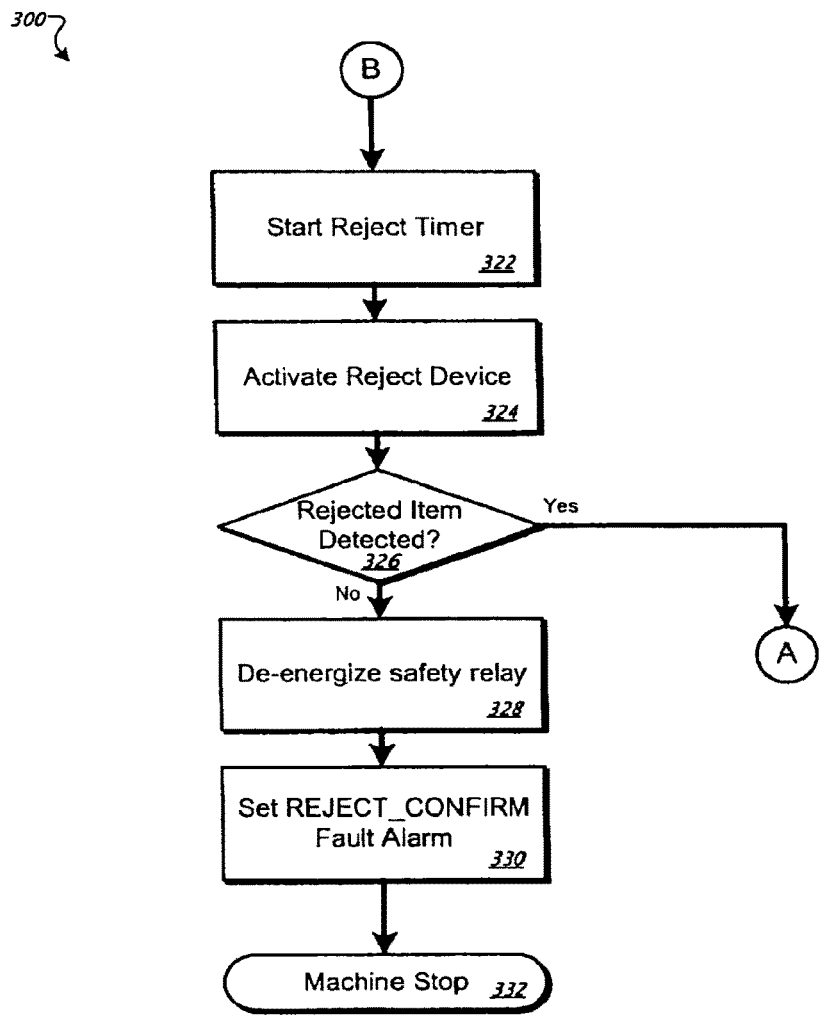

FIGS. 3A and 3B show an example fail-to-safe inspection process 300. The process 300 starts when a first sensor is activated (302) by an item (e.g., the item 110 of FIG. 1) travelling on a conveyor (e.g., the conveyor 105 of FIG. 1). In some embodiments, the first sensor may be the sensor 140 of FIG. 1.

In some embodiments, the first sensor may be activated when the item (e.g., the item 110 of FIG. 1) is within the sensing range of the sensor. For example, the first sensor 140 may be a vision inspection system that may self-trigger when an item is detected within the vision inspection system's field of view. In another example, the first sensor 140 may be a radio frequency identification (RFID) reader that continually polls for the presence of an RFID tag that may be included with the item. When the item and the included RFID tag come within range of the RFID reader, the RFID reader may detect the presence of the RFID tag and activate a reading process.

In some embodiments, the first sensor 140 may be activated by an external trigger. For example, the first sensor may be a barcode scanner that is triggered by a break-beam detector (e.g., the sensor 137 of FIG. 1), or similar device. When the item passes by the trigger device 137, an activation signal may be sent to activate the first sensor 140.

When the first sensor 140 is activated (302), a timer is started 304. When the item passes by a second sensor (e.g., the sensor 145 of FIG. 1), the second sensor is activated (306). In some embodiments, the first sensor 140 and the second sensor 145 may be the same type, make, model, and/or configuration of sensor device. In some embodiments, the first sensor's configuration may be copied to the second sensor 145 by connecting the sensors together.

Occasionally, the second sensor 145 may not be activated. For example, the second sensor 145 may develop a fault and be unable to be activated. In this example, the timer that was previously started (304) may time out when the first and second sensors 140-145 fail to activate within the timeout period. If a sensor timeout has been detected (308), then a SENSOR_FAIL state is set (310), and a machine stop operation is performed (312).

If no sensor timeout has been detected (308), then the sensor readings are compared (314) to verify that the sensor readings are the same. If the comparison (314) is not provided a readable code to compare, then a NO_READ state is set (316) to indicate that a readable code is not available.

If the comparison (314) determines that the readings are the same, then the sensor readings are compared (318) to verify that the sensors have read a match for the expected identity of the item. If the comparison (318) determines that a match has been made, then a MATCH state is set. The item is not rejected, and the process 300 waits for the first sensor to be activated (302).

In some implementations, the process 300 may include an operation to activate a fail-to-safe rejection device when a MATCH state is set (320). For example, the rejection device 160 of FIG. 1 may be configured to always divert items to the reject path 165 unless it is activated to allow an item to pass.

If the comparison (318) cannot determine a code, then the NO_READ state is set (316). When a NO_READ state is set (316), the item that caused the NO_READ state may be an allergenic item that should be rejected. The process 300 continues in FIG. 3B where a reject timer is started (322). A reject device (e.g., the diverter 160) is activated (324) to divert the item to the reject path (e.g., the reject path 165). In some implementations, the reject device 160 may be a fail-to-safe reject device that is normally set to reject items unless otherwise activated, and may not need to be activated (324) to direct the item to the reject path 165.

The process waits to receive a signal from a reject path sensor (e.g., the sensor 150 of FIG. 1). If the rejected item is detected (326) within a predetermined time measured by the reject timer, the item is determined to have been properly rejected and the process 300 continues by waiting for the first sensor 140 to be activated 302.

If the rejected item is not detected (326), then a safety relay is de-energized (328). In some embodiments, de-energizing (328) the safety relay may cause the conveyor 105 to stop. A REJECT_CONFIRM fault alarm is set (330) to alert a line operator. In some embodiments, the REJECT_CONFIRM fault alarm may trigger an audible and/or visual indicator, such as a semaphore (e.g., a light tree). A machine stop operation is then performed (332).

In some implementations, the REJECT_CONFIRM fault alarm and the subsequent machine stop operation (332) may be performed to prevent an allergenic item from being passed. For example, a REJECT_CONFIRM fault alarm may occur because an item that was expected to be rejected was not detected as being properly rejected. Therefore, a possibility exists that an allergenic item may still be on the conveyor 105. In this example, the conveyor 105 may be stopped to allow a line operator to remove items from the conveyor 105 to prevent a possibly allergenic item from passing.

In some implementations, a machine stop can be called using an independent safety relay channel A in parallel with an independent channel B of a relay circuit to drive an emergency stop circuit. As such, a fault signal can be received if an input does not reach the machine. For example, a relay with two independent channels may be connected to a machine stop output of a controller (e.g., the controller 155 of FIG. 1) so the two independent channels may be energized when the line starts up. In this example, the independent channels may de-energize when the line stops. The independent channels may de-energize for a NO_READ state. If an outside event occurs, such as an electrical surge causing damage, the relay channel contacts may drop. In this example, the relay may trigger a machine shutdown even if one of the relay channels has malfunctioned (e.g., the contacts have welded).

In some implementations, a safety relay may provide feedback to a controller (e.g., the controller 155 of FIG. 1) by using two or more independent sets of contacts when energized. For example, the relay may be energized by an output of the controller to actuate a first set of contacts that close or open a circuit (e.g., a machine shutdown circuit, a diverter activation circuit). When energized, the relay also opens or closes a second set of contacts that are monitored by the controller to provide a signal that confirms the activation of the relay.

In some implementations, a safety relay may provide feedback to a controller (e.g., the controller 155 of FIG. 1) by using two or more relays in series. For example, the controller may activate a first relay to close or open a first circuit (e.g., a safety circuit, a rejection device activation circuit, an alarm circuit). The first circuit may be connected to energize or de-energize a second relay, and the second relay may be used to switch a feedback signal that may be monitored by the controller. The second relay may be monitored to confirm that the first circuit has been activated.

In some implementations, more than one output from a sensor can be determined. For example, one output can be used to trigger the sensor and another output can transmit a signal to trigger a code cycle counter. In some implementations, a trigger signal outside the sensor can be sent to the sensor and to trigger a code cycle counter.

The illustrated examples have given several descriptions of the system 100 of FIG. 1, the process 300 of FIG. 2, and the process 300 of FIGS. 3A and 3B, may be used for processing food-related items, other embodiments may exist. For example, the sensors 140 and 145 may be a pair of vision inspection systems, and the item 110 may be a blister pack of pills. The sensors 140 and 145 may inspect the blister pack to verify that the blister pack contains the correct number and type of pill. In another example, the item 110 may be a machined part, such as a bolt, and the sensors 140 and 145 may inspect the bolt to verify that the bolt is the correct length, diameter, and/or head size. In yet another example, the sensors 140 and 145 may be x-ray inspection systems configured to inspect cuts of meat for bone fragments, to inspect wine bottles for glass shards, or to inspect stuffed toys for needles that may have been lost in the toys' sewing process.

In some implementations, the process 200 may be used to sort packages in a shipping terminal. For example, a shipped package may have a barcode that contains the package's destination address and/or shipping zone. As the package travels down a conveyor, the package may pass a redundant pair of photo eyes. As the photo eyes sense the package, each photo eye may send a trigger signal to a controller, such as a programmable logic controller (PLC). When the controller receives the trigger signal from the first photo eye, the controller may start a timer to measure the amount of time between the arrival of the trigger signal and the second.

If the second trigger signal is not received within a predetermined period, such as 500 ms, the controller may determine that the second photo eye has malfunctioned and respond by setting a sensor failure alarm. In other examples, the controller may sense the second trigger signal without a preceding first trigger signal, determine that the first sensor has malfunctioned, and respond by setting a sensor failure alarm. The controller may respond to the receipt of one or both trigger signals by activating a barcode scanner. In other embodiments, signals from one or both of the photo eyes may be used to trigger the barcode scanner directly. The barcode scanner may be activated immediately, or after a period that allows the package to travel within the sensing range of the barcode scanner.

In some embodiments, the controller may set a SENSOR_FAIL state before activating the barcode scanner. If the barcode scanner does not return an identification signal within a timeout period, the SENSOR_FAIL state may remain active. The SENSOR_FAIL state may be used to trigger an alarm to alert line operators that the barcode scanner may have malfunctioned.

When activated, the barcode scanner may begin to scan for the destination barcode on the package to determine of the barcode matches a preconfigured criterion. For example, the barcode may include a shipping zone code, a ZIP code, country code, state code, or combinations of these or other information that may be used to sort and/or route shipped packages to the correct destination. In other examples, the barcode scanner may be configured to evaluate the information contained by the barcode, or to evaluate the quality of the barcode itself. For example, the barcode scanner may be configured to verify that the destination address includes a street address, a city, a state, and a ZIP code. In other examples, the barcode scanner may be configured to reject packages with smudged or otherwise damaged barcodes by rating the quality of the barcode itself. For example, a substantially ideal barcode may be scanned and given a score of "100", whereas a barcode that has been partly torn off may only be given a score of "40". If the barcode matches the preconfigured criterion, then a MATCH signal may be sent to the controller. If the barcode cannot be read, then a NO_READ signal may be sent to the controller.

In some embodiments, the barcode scanner may be configured to perform the evaluation of the scanned barcode and/or barcode information. In some embodiments, the barcode scanner may read the barcode and return the scanned barcode information to the controller for evaluation.

When the controller receives a signal from the barcode scanner, the SENSOR_FAIL state may end. If a MATCH signal is received, then the controller may set a MATCH state and may allow the package to continue on the conveyor. If a NO_READ signal is received, then the controller may set a NO_READ state and activate a rejection device to direct the package off the conveyor. If the barcode scanner does not return an identification signal within a timeout period, the SENSOR_FAIL state may remain active.

In some embodiments, the system 100 may include features to protect components of the system 100 from water, dust, humidity, or other substances that may damage the controller 155 and/or other components of the system 100. For example, the controller 155 may be housed in a NEMA 4X, IP65 sealed enclosure. The NEMA enclosure may include washdown-rated passthroughs for the sensors' 140-150 cables, power connections, data (e.g., serial, Ethernet, DeviceNet) connections, and/or other cables. An example of such passthroughs are "icotek" modular cable management systems commercially available from icotek GmbH, or Eschach, Germany.

In some embodiments, the system 100 may include a product verification module to teach a new code to the system 100. For example, the system 100 may need to input a new code for a changeover on the product being produced. The system 100 may require the operator to input the new code. The code may be manually input to the system using a keypad. The operator may scan the code with an RFID reader to input the code to the system. Similarly, the system 100 may have a database of codes saved that the operator can select.

In some implementations, the system 100 may already contain a plurality of codes and their phrase-equivalent, so that the operator can visually check that the code entered is correct. For example, the system 100 may store the text "Whole Grain Cereal Squares" for a certain code and the text "Frosted Cereal Squares" for another code. If the product to be made is "Whole Grain Cereal Squares", but the system 100 receives the code for "Frosted Cereal Squares", the operator may read "Frosted Cereal Squares" and prevent the system 100 running with the incorrect code. In some implementations, the system 100 may require the operator to press a button "Accept" on the display to verify that the phrase-equivalent matches the product scheduled to be made. Alternatively, the operator can be required to enter the same code twice into the system 100 before the code is accepted.

In some embodiments, the operator can use a mechanical key or a passcode to verify that they are allowed to change the code in the system 100. For example, if the operator wants to enter a new code to the system 100, the system 100 may first require a key to be inserted before the system 100 may be taught any new codes. The system 100 may also require an electronic key. The electronic key may, for example, may provide for a specific level of access rights for a particular user. The electronic key may be used with an electronic key adapter that can transfer data to the controller 124 or the PLC 153. The electronic key may be stored on an employee badge. The electronic key may also be included on an RFID chip. The system 100 may also use a fingerprint scanner or retinal scanner to receive data as an electronic key.

In some implementations, the system 100 may require a supervisor or other employee to provide a credential key, e.g., a key only provided to individuals with certain levels of responsibilities. The credential key may be a passcode, a mechanical key, or an electronic key. The system 100 may require an individual who is offline to approve a new code. For example, an e-mail may be sent to a manager to approve a code, where the code may be taught to the system only when the manager sends a reply e-mail to the system 100.

In some implementations, the system 100 can require two separate keys, e.g., mechanical keys, electronic keys, passcodes, or a combination of mechanical keys, electronic keys, and passcodes. For example, the system 100 may require the keys to belong to two separate operators. The system 100 may require one key from the operator and one from a supervisor. Likewise, the keys may be both credential keys. In still other embodiments, each permitted operator may receive an electronic key that is traceable to the permitted operator. For example, the system 100 may require that two or more operators insert their electronic keys into electronic key adapters at the same time.

In some implementations, the system 100 may perform an automated check to determine if the input is correct. For example, the system 100 may send a request to the controller 124 to determine the scanned materials to the line to determine if the code is associated with the scanned materials. The scanned materials may include a code that may be input to the system. Alternatively, associations between the codes and materials may be stored in the system 100 or offline. Similarly, the system 100 may send a request to a planning or logistics database for data regarding the next planned product change. If the input code does not match the planned code, the system 100 may reject the input code. Alternatively, the system 100 may require override measures, e.g., multiple keys, a credential key, or an offline authorization.

It a product fails inspection according to one or more sensors 137, 139, 140, or 145, the product may be rejected by mechanism 160. It is necessary to keep track of the failed product as it moves down the conveyor 105 to rejection device 160. The rejection device and/or its associated controller must be apprised of which product is coming along the conveyor that was earlier determined to have failed inspection. In fact, several products are continually monitored at one time and when a particular product arrives in front of the rejection mechanism 160, it must be rejected. Actuation of the rejection mechanism may be controlled based on position of the failed product and reject time (i.e., a time from when controller 124 sends a signal to actuate rejection mechanism 160 until rejection mechanism 160 makes contact with the failed product).

Figure 4:
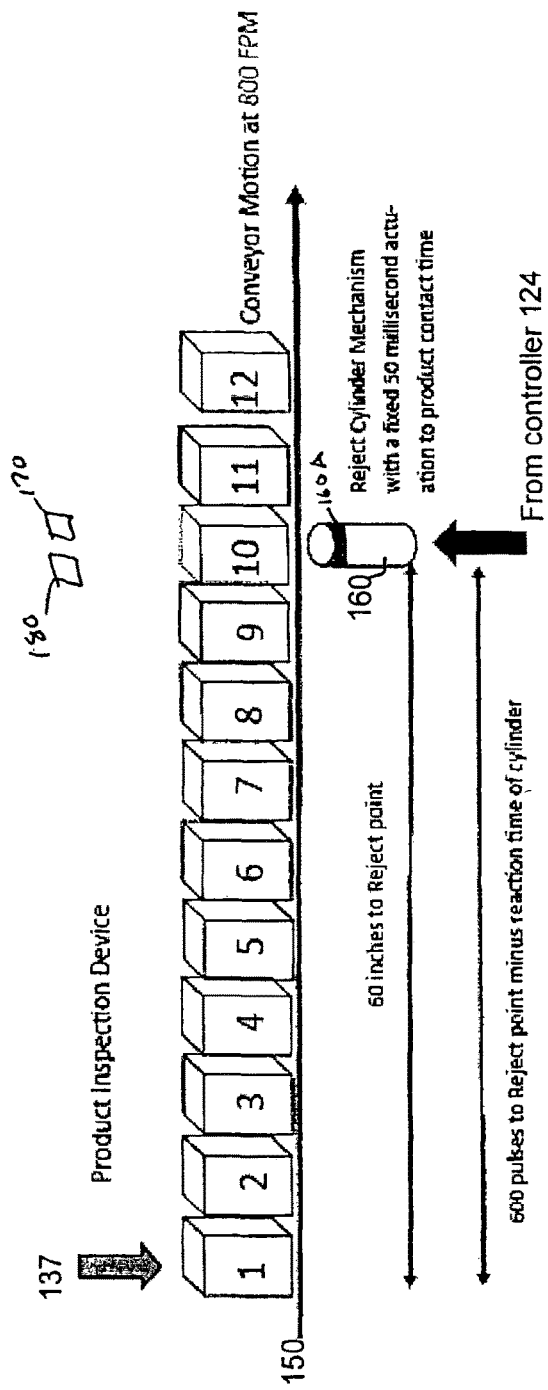
FIG. 4 shows an exemplary conveyor line with a rejection device.

FIG. 4 shows an example of conveyor 150 with a product inspection device (sensors 137, 139, 140, and/or 145) and rejection mechanism 160. In this example, the products are packages that are each 5 inches wide with 1 inch gaps between them. The conveyor speed is a constant 400 feet per minute (FPM). At a constant speed of 400 FPM, the packages travel 1 inch in 12.5 milliseconds. If the inspection at package position 1 in FIG. 4 determines that the package fails the inspection criteria, the controller 124 will need to activate the rejection mechanism 160 at the appropriate time in order to knock of the moving package off of the conveyor 150. The package, which failed inspection at position 1, will be at position 10 (location of rejection device which is 60 inches away from position 1) 750 ms (12.5 ms/in×60 inches) after the inspection at position 1. However, the system also needs to account for the time taken to overcome the relatively fixed static inertia of the rejection device 160. For example, it may take 50 ms for the rejection device to make contact with a package at position 10 after receiving an actuation signal from controller 124. Thus, the controller 124 would issue the actuation signal to the rejection device 160 at 700 ms (750 ms−50 ms) in order to hit the moving package.

Rather than using time, an encoder based system may be used. Encoder E outputs 10 pulses per inch of conveyor movement. Thus, using the 60 inch distance between the product inspection point and the rejection point shown in FIG. 4, the distance to the rejection point from the inspection point is 600 pulses regardless of conveyor speed. Without considering the delay caused by the static inertia of the rejection mechanism, the rejection mechanism would fire when the conveyor 150 travels an equivalent of 600 pulses. To compensate for the 50 ms it takes to overcome the static inertia of the rejection mechanism, 40 pulses are subtracted from the 600 pulses. The value of 40 pulses is calculated from the formula $$T^*(1/V) \times P = PA, \text{ where} \tag{1}$$

T is the reject time between the time the controller 124 sends the actuation signal to the rejection mechanism 160 and the rejection mechanism 160 makes contact with the package; pulse adjustment. In the above example, T=50 ms, 1/V is 12.5 ms/inch, P is 10 pulses per inch, and PA is thus 40 pulses. Thus, the controller 124 would activate the rejection mechanism after 540 pulses (600 pulses−40 pulses) in order to hit the package at reject position 10. However, this approach assumes that the conveyor velocity is constant.

Figure 5:
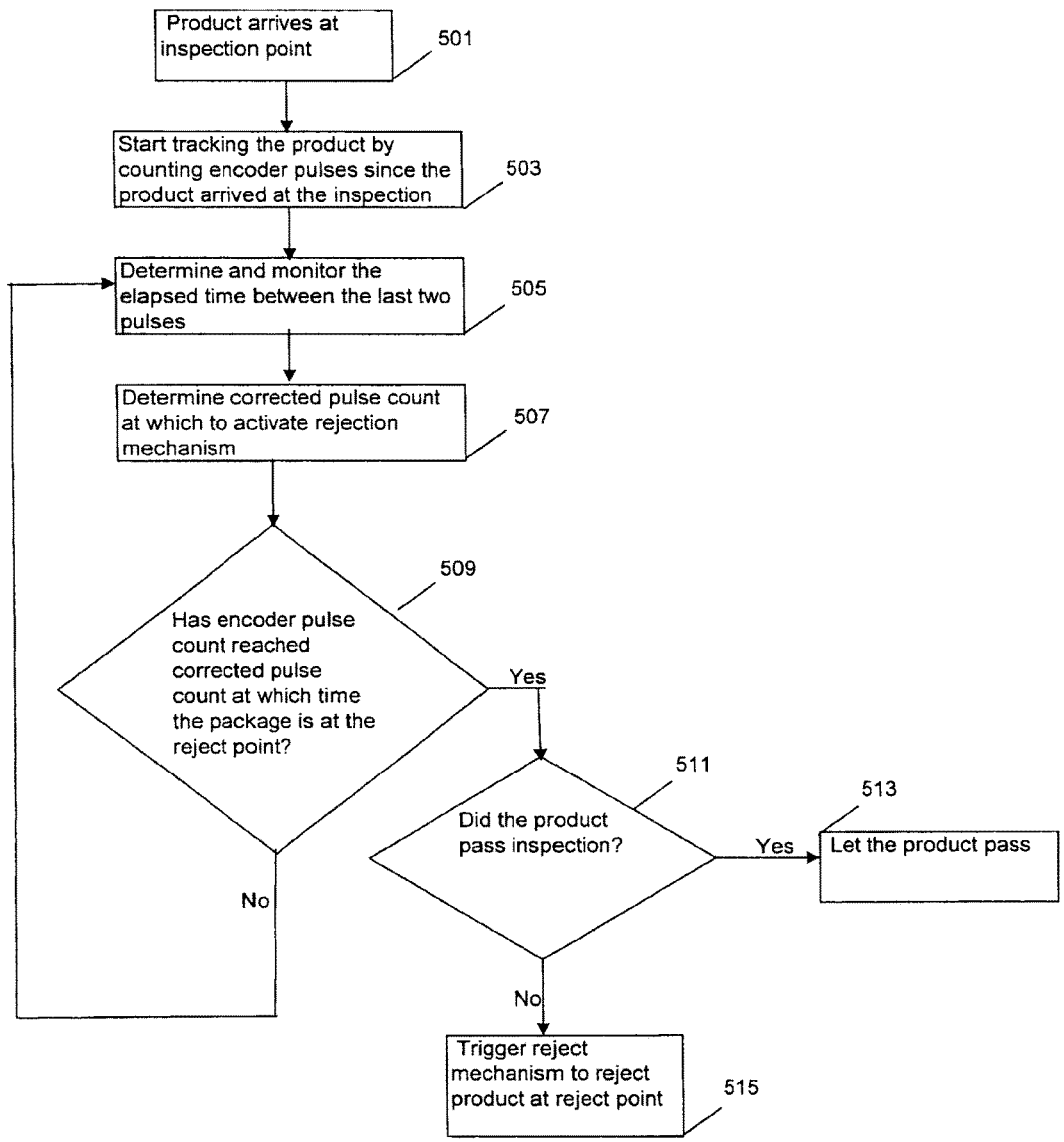
FIG. 5 shows an exemplary method for activating the rejection device.

In order to manage a constantly variable speed conveyor belt, the system may be programmed to dynamically combine both position and reject time to determine when to fire the rejection device. In one exemplary embodiment, the setup shown in FIG. 4 is used, along with an encoder that outputs 10 pulses per inch, and a variable speed conveyor. According to the exemplary process in FIG. 5, a product arrives at inspection point 1 in step 501. In step 503, controller 124 starts tracking the product position on conveyor 150 by counting encoder pulses since the package arrived at inspection point 1 while waiting for the inspection result to be decided.

In step 505, controller 124 determines a real-time velocity of the conveyor 150. The real-time velocity of the conveyor may be determined by monitoring the elapsed time between the last two pulses output by the encoder as the package moves along with conveyor 150. Velocity may be measured in other ways, for example, by averaging over a predetermined number of pulses (e.g., average over 10 pulses). As conveyor 150 increases in speed, the time between pulses decreases. As conveyor 150 decreases in speed, the time between pulses increases. The controller 124 is able to determine the increases and decreases in conveyor speed based on monitoring the elapsed time between the last two pulses or monitoring a change in speed based on an average of several pulses. For example, the velocity V of the conveyor (represented as pulses per second) is 1/t, where t is a difference in time between the last two pulses or t may be determined from an average of a predetermined number of pulses.

The controller could determine a real-time velocity of the conveyor 150 by measuring input pulse frequency for every predetermined length of conveyor travel (every ⅛ of an inch for example) or by measuring conveyor speed every predetermined per unit of time (i.e., number of pulses every 2 or 5 ms). Rather than deriving real-time conveyor speed based on the pulses output by encoder E, various sensors could also be incorporated into the system to measure conveyor speed (i.e., an optical sensor 2000 to measure conveyor speed).

In step 507, the controller 12 dynamically determines the PA (pulse adjustment) or correction amount and the number of pulses that would trigger the activation of the rejection mechanism 160 if a package failed inspection. The PA or correction amount may be dynamically determined through recalculation whenever a predetermined number of pulses are detected (i.e., every 2 pulses, 3 pulses, etc.). The controller 124 may be programmed with an initial preset pulse count value at which to activate the rejection device 150 if the package failed inspection. Based on the example discussed above, the controller 124 may be programmed with a default value that activates rejection device 160 after 560 pulses (i.e., assuming a constant conveyor speed of 400 FPM). Other preset values could be used. The controller is further programmed to dynamically adjust the number of pulses that indicate when to trigger the rejection mechanism 160 in case of inspection failure; this adjustment being dynamic and based on the PA or correction amount. As conveyor speed increases, pulses are subtracted from the default value of 560 pulses. As conveyor speed decreases, pulses are add to the default value of 560 pulses.

For example, the conveyor speed may be changed from 400 FPS to 800 FPS, which may take the effect over a matter of second or minutes. In step 507, the controller 124 uses equation (1) supra to dynamically determine the PA (pulse adjustment), which is then dynamically applied (i.e., added or subtracted) to the initial preset pulse count value to determine at what pulse count the rejection mechanism is activated.

In step 509, the controller 124 determines whether the encoder pulse count has reached the initial preset pulse count value corrected by the PA (pulse adjustment). If the answer at step 509 is yes, the process proceeds to step 511 and controller 124 determines whether the package passed the inspection. If the package passed inspection (yes at step 511), then the process proceeds to step 517 and the rejection mechanism is not activated when the package is at the rejection point (position 10 in FIG. 4). If the package failed inspection (no at step 511), the process proceeds to step 515 the controller 124 sends an actuation signal to the rejection device to reject the package at the rejection point (position 10 in FIG. 4).

If the answer at step 509 is no (the encoder count value does not equal the initial preset pulse count value corrected by the PA), then the process proceeds back to step 505.

In the above examples, it was assumed that the amount of time needed to overcome the static inertia of the rejection device 160 is 50 ms (reject time). However, the system may dynamically measure reject time. For example, if the rejection device 160 includes a rod extended by a solenoid, a reflector 160A may be disposed on top of the rod. A laser 170 and sensor 180 may be mounted above the conveyor 150 at rejection point 10. When the rod of rejection device 160 makes contact with the package on the conveyor, light from the laser 170 reflects off of the reflector 160A and is received back at the sensor 180. The controller 124 can determine the difference in time between when the actuation signal is provided to the rejection device and when the laser light is received by the sensor. This difference in time is reject time. This reject time advantageously accounts for total system action time (i.e., friction in the rejection mechanism, signal delay between the controller 124 and rejection mechanism 160, and compression and lag time associated with air pressure when rejection mechanism 160 is an air coil). The reject time may be determined and stored in a memory that is accessible to the controller 124.

When rejection mechanism 160 is an air coil, the system may also include an air pressure sensor and air accumulator 190. When the air pressure sensor detects a predetermined change in air pressure for the air coil, an alarm can be activated and the conveyor 150 may be stopped. Air pressure sensor and air accumulator 190 also may maintain a constant air pressure for the air cylinder. Air pressure sensor and air accumulator 190 may be embodied in one or multiple components, and inclusion of one does not necessarily require inclusion of the other.

A number of embodiments of the invention have been described. Nevertheless, it will be understood that various modifications may be made without departing from the spirit and scope of the invention. The numbers provided in the discussion of the various embodiments are only examples, and other values may be used without departing from the spirit and scope of the invention. Accordingly, other embodiments are within the scope of the following claims.

The invention claimed is:

1. A system comprising:
a continuous production line comprising a primary conveyor path and a secondary conveyor path;
a data repository configured to store data for a plurality of electronic keys, wherein
each of the plurality of electronic keys is associated with at least one product of a plurality of products for processing on the continuous production line;
a first scanner configured to
detect key information associated with a respective key of the plurality of electronic keys, wherein
the respective key is presented to the first scanner and
responsive to the detecting, transmit the key information;
at least one second scanner configured to
scan each item of a plurality of items as the plurality of items moves along the primary conveyor path of the continuous production line, and
responsive to the scanning, transmit respective scan information;
a rejection device positioned proximate a junction of the primary conveyor path and the secondary conveyor path; and
a controller communicatively connected to the first scanner, the at least one second scanner, and the rejection device, wherein the controller is programmed to
receive, from the first scanner, the key information;
identify, responsive to receiving the key information, the at least one product of the plurality of products associated with the respective key, wherein
identifying the at least one product comprises associating the key information with one of the plurality of electronic keys;
receive, from the at least one second scanner, the respective scan information,
identify, for one or more items of the plurality of items, failure of an inspection criteria based on a lack of correspondence between the at least one product associated with the electronic key and the scan information for the respective item, and responsive to the failure of the inspection criteria, cause actuation of the rejection device for moving the respective item from the primary conveyor path to the secondary conveyor path, wherein actuation timing for causing actuation is based on a velocity of the primary conveyor path.

2. The system of claim 1, wherein the first scanner comprises a RFID scanner for detecting a key stored on a RFID chip.

3. The system of claim 1, wherein the first scanner comprises at least one of a fingerprint scanner and a retinal scanner for detecting a biometric electronic key.

4. The system of claim 1, wherein each key of the plurality of electronic keys is associated with a system operator of a plurality of system operators.

5. The system of claim 4, wherein:
the controller is programmed to receive second key information; and
identifying the at least one product of the plurality of products comprises associating the key information with a first system operator of the plurality of system operators and associating the second key information with a second system operator of the plurality of system operators.

6. The system of claim 5, wherein the second key information corresponds to at least one of a passcode, an electronic key, and a mechanical key.

7. The system of claim 1, wherein, for at least one product of the plurality of products, the respective scan information comprises information derived from a machine-readable code.

8. The system of claim 1, wherein the controller is further programmed to present, to a display communicatively coupled to the controller, identification information for the at least one product associated with the respective key.

9. The system of claim 8, wherein the controller is further programmed to receive, from an operator input device communicatively coupled to the controller, an input verifying the at least one product associated with the respective key.

10. The system of claim 1, wherein the controller is further programmed to confirm, using stored schedule data for the continuous production line, that the at least one product associated with the respective key corresponds to a scheduled product for the continuous production line.

11. A method comprising:
detecting, with a first scanner, an electronic key presented to the first scanner, the electronic key associated with at least one product of a plurality of products monitored on a continuous production line;
scanning, with at least one second scanner, a plurality of items as the plurality of items moves along a primary conveyor path of the continuous production line;
responsive to receiving, from the first scanner, key information associated with the electronic key, identifying, at a controller, the at least one product based on electronic key data stored in a data repository;
providing, by the at least one second scanner, scan information regarding a respective scan of each item of the plurality of items;
receiving, at the controller, the scan information for each item;
identifying, by the controller, failure of the scan information for a respective item of the plurality of items to meet an inspection criteria based on a lack of correspondence between the at least one product and the scan information; and
responsive to the failure, causing actuation of a rejection device for moving the respective item from the primary conveyor path to a secondary conveyor path, wherein timing of the actuation is based on a velocity of the primary conveyor path.

12. The method of claim 11, wherein the first scanner comprises a RFID scanner for detecting a key stored on a RFID chip.

13. The method of claim 11, wherein the first scanner comprises at least one of a fingerprint scanner and a retinal scanner for detecting a biometric electronic key.

14. The method of claim 11, wherein each key of the plurality of electronic keys is associated with a respective system operator of a plurality of system operators.

15. The method of claim 14, further comprising:
receiving, at the controller, second key information;
wherein identifying the at least one product of the plurality of products comprises associating the key information with a first system operator of the plurality of system operators and associating the second key information with a second system operator of the plurality of system operators.

16. The method of claim 15, wherein the second key information corresponds to at least one of a passcode, an electronic key, and a mechanical key.

17. The method of claim 11, wherein for at least one product of the plurality of products, the respective scan information comprises information derived from a machine-readable code.

18. The method of claim 11, further comprising presenting, to a display communicatively coupled to the controller, identification information for the at least one product associated with the respective key.

19. The method of claim 18, further comprising receiving, at an input device for the controller, an input verifying the at least one product associated with the respective key.

20. The method of claim 11, further comprising confirming, by the controller using stored schedule data for the continuous production line, that the at least one product associated with the respective key corresponds to a scheduled product for the continuous production line.

* * * * *